April 9, 1940.  T. P. FLYNN ET AL  2,196,458
SNOW TRACTOR
Filed Oct. 22, 1937  9 Sheets-Sheet 1

INVENTORS.
THEODORE P. FLYNN.
RAYMOND E. NEILS.
By: ATTORNEYS.

FIG. 3

April 9, 1940.    T. P. FLYNN ET AL    2,196,458
SNOW TRACTOR
Filed Oct. 22, 1937    9 Sheets-Sheet 3

INVENTORS
THEODORE P. FLYNN
RAYMOND E. NEILS
BY
ATTORNEYS.

April 9, 1940.  T. P. FLYNN ET AL  2,196,458
SNOW TRACTOR
Filed Oct. 22, 1937  9 Sheets-Sheet 4

INVENTORS
THEODORE P. FLYNN
RAYMOND E. NEILS
ATTORNEYS.

April 9, 1940.   T. P. FLYNN ET AL   2,196,458
SNOW TRACTOR
Filed Oct. 22, 1937   9 Sheets-Sheet 5

INVENTORS
THEODORE P. FLYNN
RAYMOND E. NEILS
ATTORNEYS.

April 9, 1940.　　T. P. FLYNN ET AL　　2,196,458
SNOW TRACTOR
Filed Oct. 22, 1937　　9 Sheets-Sheet 6

FIG. 12

INVENTORS.
THEODORE P. FLYNN.
RAYMOND E. NEILS.
ATTORNEYS.

INVENTORS
THEODORE P. FLYNN
RAYMOND E. NEILS
ATTORNEYS.

April 9, 1940.   T. P. FLYNN ET AL   2,196,458
SNOW TRACTOR
Filed Oct. 22, 1937   9 Sheets-Sheet 8

INVENTORS.
THEODORE P. FLYNN.
RAYMOND E. NEILS.
ATTORNEYS.

April 9, 1940.　　T. P. FLYNN ET AL　　2,196,458
SNOW TRACTOR
Filed Oct. 22, 1937　　9 Sheets-Sheet 9

INVENTORS.
THEODORE P. FLYNN
RAYMOND E. NEILS
BY
ATTORNEYS.

Patented Apr. 9, 1940

2,196,458

UNITED STATES PATENT OFFICE

2,196,458
SNOW TRACTOR

Theodore P. Flynn and Raymond E. Neils, Portland, Oreg.; dedicated to the free use of the People of the United States of America Application October 22, 1937, Serial No. 170,400

7 Claims. (Cl. 180—5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to us of any royalty thereon.

We hereby dedicate the invention herein described to the free use of the people of the United States of America to take effect on the granting of a patent to us.

This invention relates to a snow tractor and a steering mechanism therefor, and one of its main objects is the provision of an improved power driven steering arrangement operated from the motor and controlled from the driver's position in the tractor.

Another object of this invention is to provide connections and kinematic linkages from the tractor to a trailing sled actuated by power controlled from the operator's position on the tractor, so that ample pressures may be exerted against the snow sled to give effective and instantaneous steering.

Still another object of this invention is to provide a complete combination of a power steering mechanism and kinematic linkages with automatic features and safety devices that eliminate the possibility of breakage from shock to the cables, cable drums, shaftings, and other parts.

A further object of this invention is to provide a correct distribution of weight, both lengthwise and sidewise, along the lowest possible point of a single track crawler-type snow tractor to obtain the lowest possible center of gravity, reduced steering effort, and to prevent listing and tipping.

A still further object of this invention is to provide such total outside width of tracks in combination with a low center of gravity that will further prevent all listing or tipping of the tractor under any kind of snow condition.

Another and still further object of this invention is to provide an arrangement and combination of track links and plates to make up a complete revolving metal track of extremely light weight and high strength thereby reducing the ground pressure per square inch, lowering still further the center of gravity of the tractor, and permitting greater travel speed with less damage to the track chain and cleat system than has been possible heretofore with the conventional or heavier flexible track systems.

The following description, considered together with the accompanying drawings, will disclose this invention more fully, its construction and operation of parts, and further objects and advantages thereof will be apparent.

Figure 1:
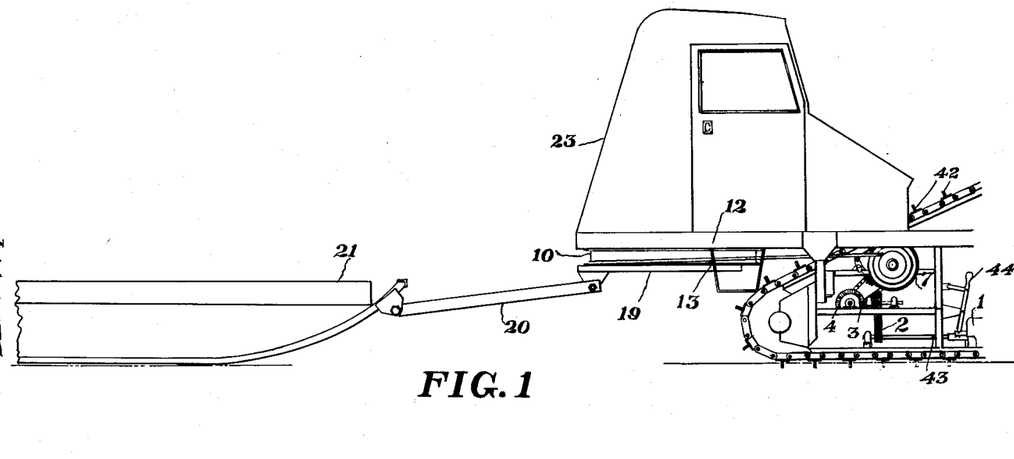
Figure 1 is a fragmentary side view of a single track tractor and steering sled.
Figure 2:
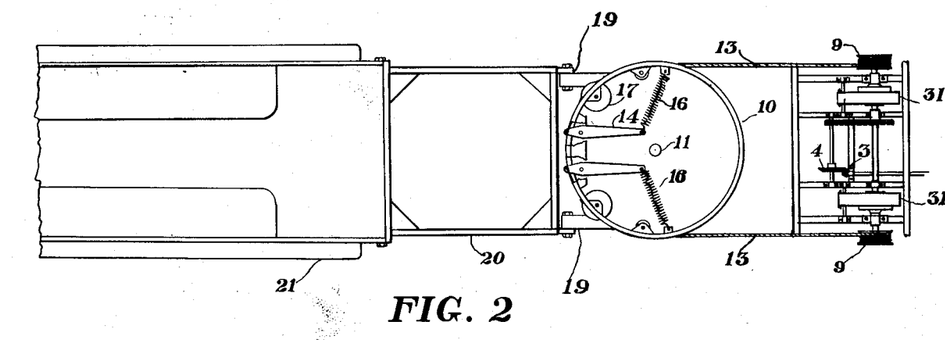
Figure 2 is a plan view of Figure 1 with cab and track removed to show the power steering device.
Figure 18:
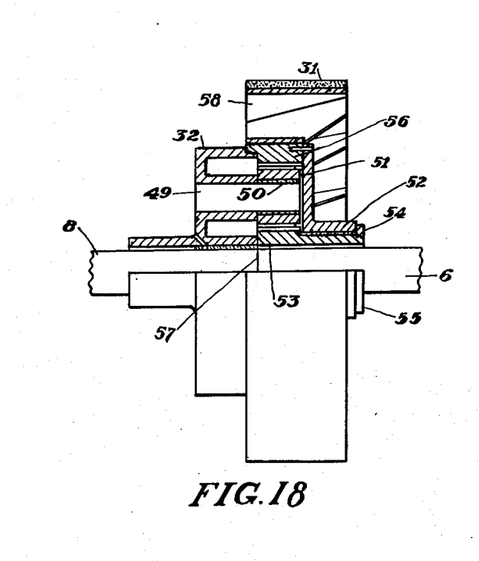
Figure 18 is a combined elevational end and end sectional view illustrating one of the gear units 7 of Figure 3.
Figure 19:
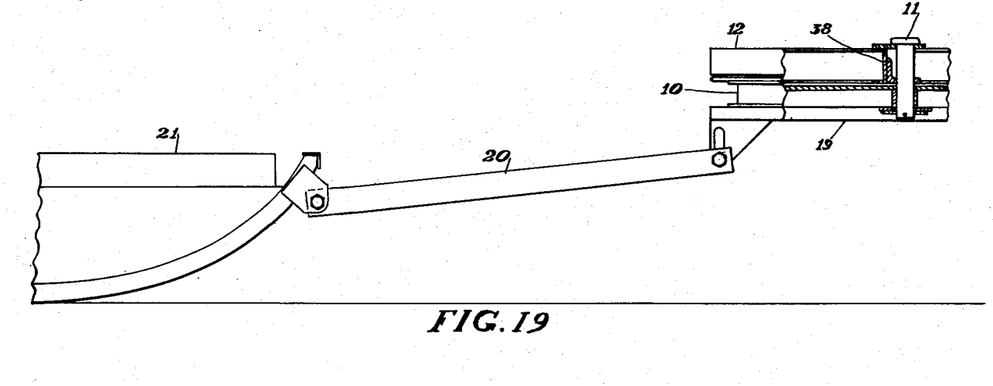
Figure 19 is a longitudinal view showing the relationship between turn-table 10, the connecting bridge or drawing bar 20, and the front end of the sled 21.
Figure 20:
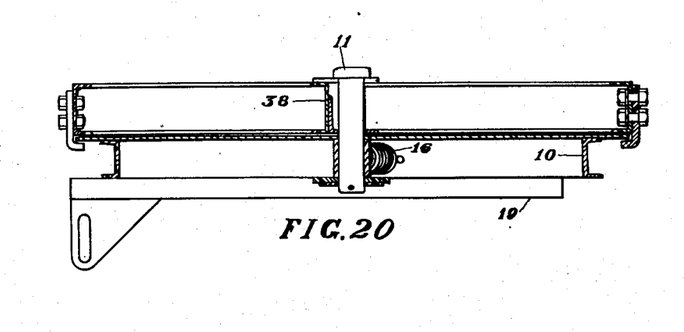
Figure 20 is a longitudinal view of the turntable 10 showing the relationship between it, the pin 11 and the frame 12, and showing also how rotation is accomplished about the center pin 11.

Referring with more particularity to the drawings, in which like parts are designated by like numerals, the numeral 1 designates a power take-off unit attached to a suitable gear transmission of a prime mover, such as the gasoline engine 39. Power is transmitted from this unit through the sprocket chain 2, the bevel pinion 3, the bevel gear 4. the sprocket chain 5, to the shaft 6, which shaft is keyed to the internal gears of the planetary gear units 7, 7. Figure 18 shows more clearly one of the planetary gear units 7. In this figure the shaft 49 is press fitted in disc 32 and supports planet pinion 51 by bushing 50. There are three pinions like the pinion 51 in each assembly and these pinions are positioned in a circle concentric with the center line of shaft 8 at 120° intervals. These pinions are driven by sun pinion 53 which is keyed to shaft 6. Internal gear 56 is driven by planet pinion 51. Said gear 56 is doweled and screwed to external gear flange 52 which has a bearing through bushing 54 on the external hub of pinion 53. A nut 55 screws onto threads on the end of the hub of sun pinion 53, and keeps flange 52 from moving horizontally. The disc 32 is keyed to shaft 8 and terminates at a point indicated by the numeral 57. In operation, the shaft 6 is running at all times. Therefore, sun pinion 53 is constantly in motion causing planet pinions 51 to rotate on shafts 49. These planet pinions rotate internal gear 56. The brake drum 58 is shrunk on the outside surface of internal gear 56, making its movements the same as the internal gear when brake band 31 is applied to the periphery surface of brake drum 58, causing it to stop. The internal gear 56 likewise stops and planet pinions 51 are forced to rotate disc 32 and thus rotate shaft 8. When brake band 31 is released the opposing frictional forces in shaft 8 are greater than the effort required to move the brake drum 58 and therefore the drum 58 resumes its rotary motion. By means of a clutching action on said planetary gear units, power is deliverable to shafts 8, 8, to which cable drums 9, 9 are keyed. A bull wheel or turntable 10 is suspended by and is rotatably mounted on a center pin 11, which pin is rigidly supported by the frame 12 (Figure 1). Flexible cables 13, 13 partially envelop the periphery of said turntable 10 terminating at the ends of the shorter arms of the levers 14, 14. Said levers are fulcrumed by means of pins 15, 15 to said turntable, and shock-absorbing springs 16, 16 are tensionally mounted between the longer arms of said levers and the rim of the turntable 10, substantially as shown. Grooved sheaves 17, 17 retain said cables 13, 13 in alignment with the levers 14, 14 and flat rollers 18, 18 keep said cables from rubbing on the outer vertical face of the turntable 10. Said sheaves and rollers are rotatably mounted in bearings integral with said turntable 10. Arms 19, 19 (Figure 1) are attached to the underside of the turntable 10, to which are fastened a drawbar 20. The other end of said drawbar is connected to a steering sled 21.

Figure 3:
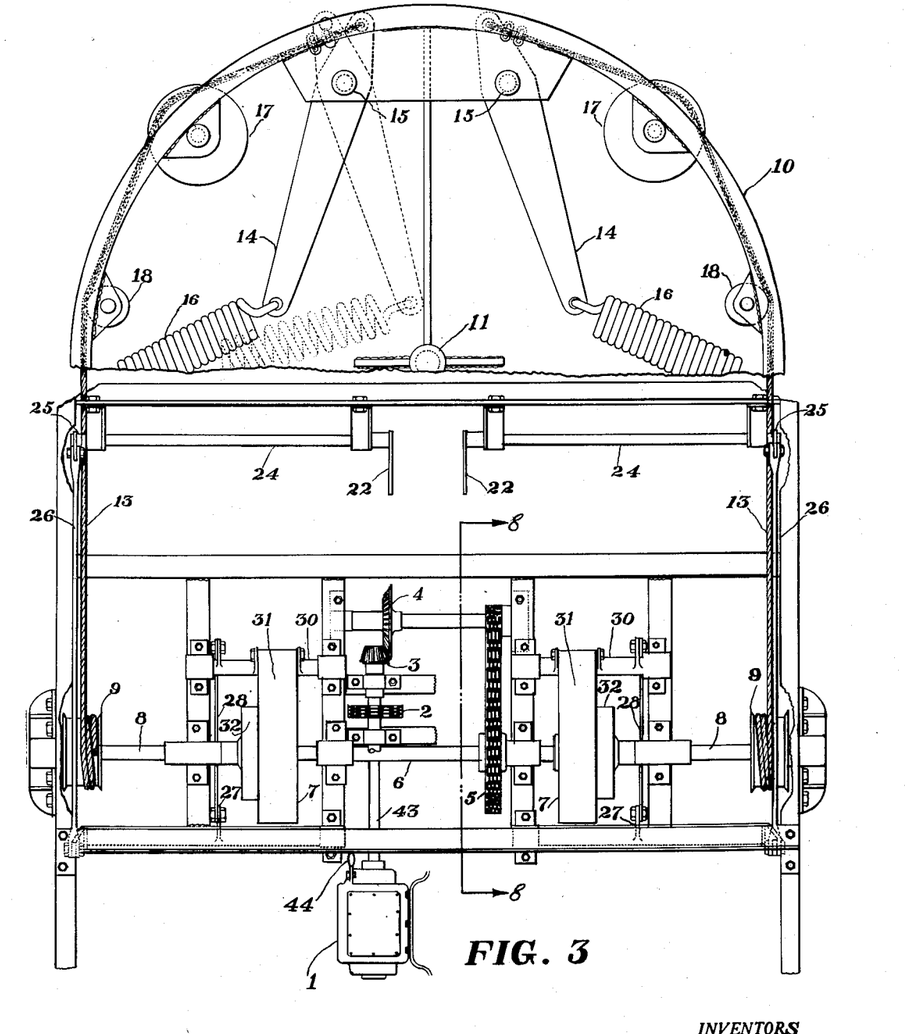
Figure 3 is a plan view of the power steering device, with half of the turntable broken away.
Figures 4, 6:
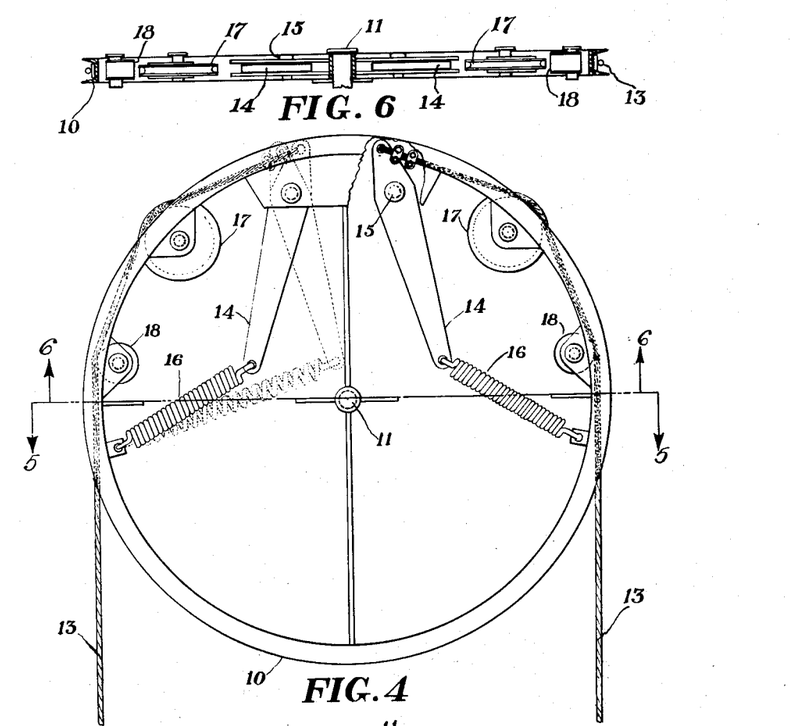
Figure 4 is a plan view of the steering turntable with the cover plate removed to show a shock-absorbing arrangement.
Figure 6 is a side sectional view taken along the line 6—6 of Figure 4, with springs 16 removed.
Figure 5:
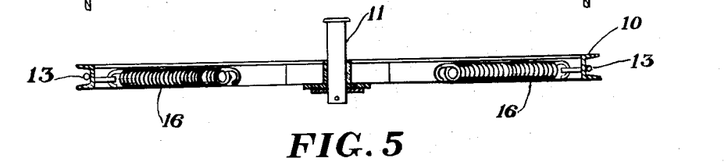
Figure 5 is a side sectional view taken along the line 5—5 of Figure 4.
Figure 7:
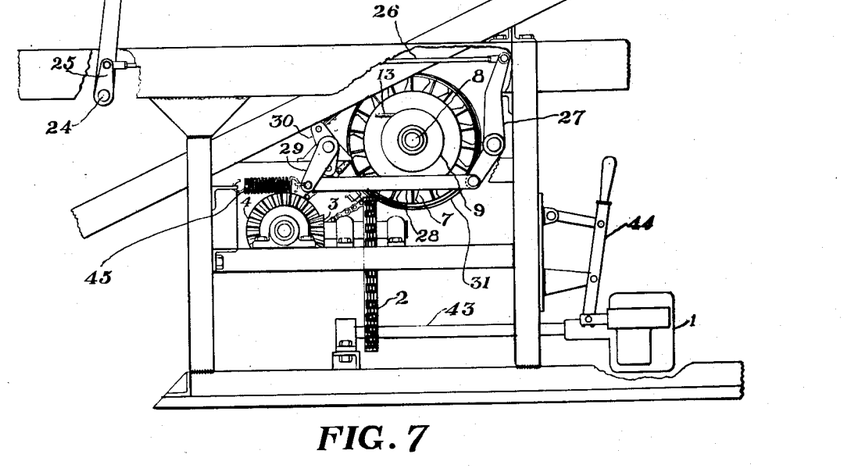
Figure 7 is an end view of the power steering mechanism with the side of the tractor frame broken away.
Figure 8:
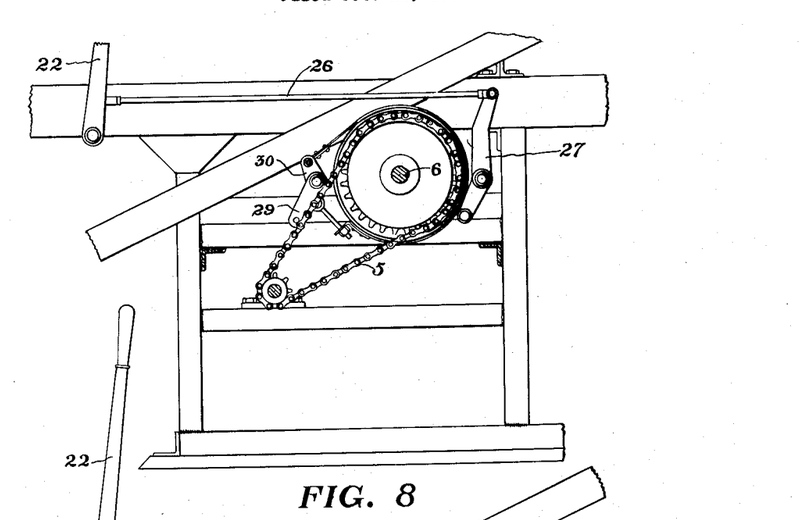
Figure 8 is a sectional view taken along the line 8—8 of Figure 3.

Steering levers 22, 22 (Figure 3) are disposed in the cab 23 and by means of shafts 24, 24, crank arms 25, 25, pull rods 26, 26, bell cranks 27, 27, connecting links 28, 28, crank arms 29, 29 (Figures 7 and 8), brake band bell cranks 30, 30 and brake bands 31, 31, the rotation of the internal gears of the planetary units 7, 7 may be arrested to cause delivery of power to the cable drums 9, 9. Springs 45, tensionally mounted between the crank arms 29, 29 and the frame of the tractor, automatically return the steering linkages to their full release position when the levers 22, 22 are manually released.

The power take-off unit 1 may be held in constant operating position by securing its shifting lever 44 (Figure 3) in engagement position, thereby providing power for steering whenever the prime mover is functioning. The rotation of the driving shaft 43 (Figure 7) of the power take-off unit 1 sets up motion in all parts geared thereto, directly or indirectly, including outer gear drums of the planetary units 7, 7. Sprockets of the sprocket chains 2 and 5, the bevel pinion 3, and the bevel gear 4 are necessary to reduce the speed and change the direction of the power delivery for planetary gear transmission. One of the planetary gear units is used when it is desired to steer the snow motor to the right, and the other when it is desired to steer to the left, by pulling either of the operating levers 22, 22, depending upon the direction it is desired to turn, toward the operator in the cab, which is to the left in Figure 7. One of the brake bands 31, 31 is made to clamp the outer surface of the internal gear drum of its corresponding planetary unit, thereby stopping the movement of said drum, and transmitting motion to the corresponding planetary disk 32, which in turn causes its corresponding cable drum 9 to rotate. This causes the cable 13 to wind around its corresponding cable drum, thereby shortening the distance between the drum and the end of the corresponding lever 14 to which said cable is connected.

Figures 13, 14:
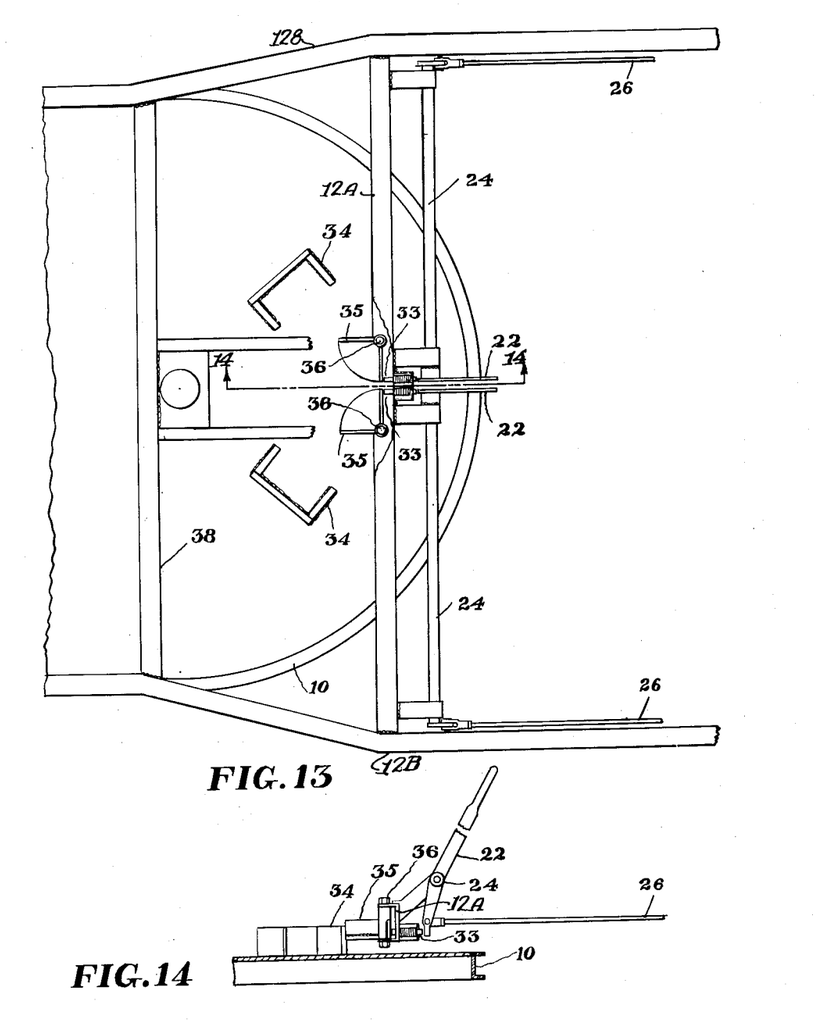
Figure 13 is a plan view of the turntable showing turning limit stops and power steering kickouts.
Figure 14 is a cross-sectional view taken along the line 14—14 of Figure 13.
Figures 15, 16:
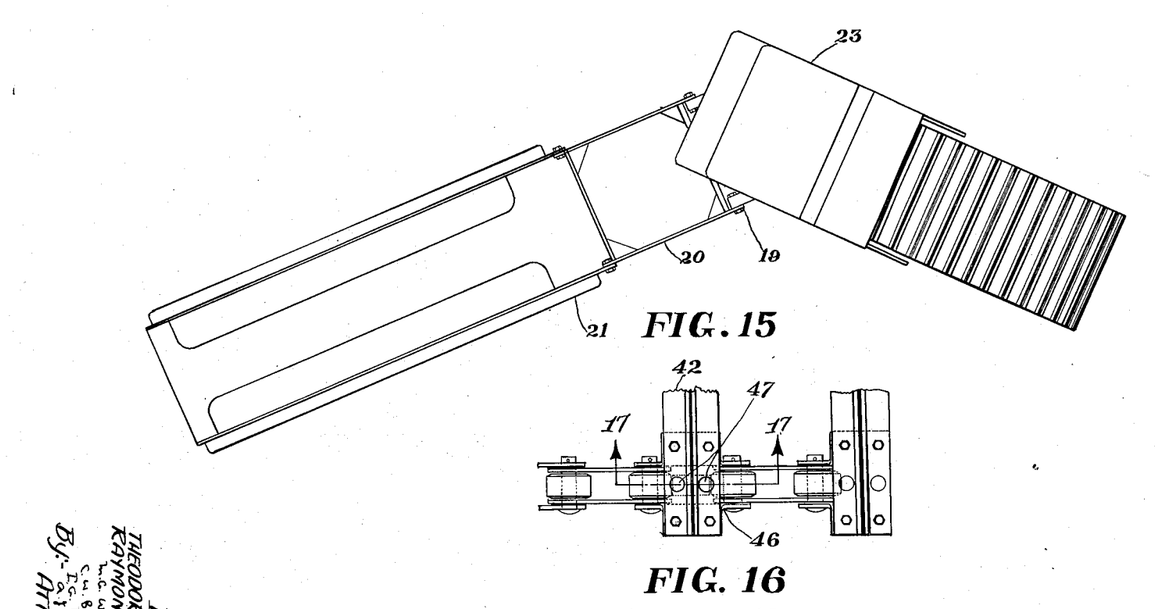
Figure 15 is a plan view of the tractor and steering sled showing their relative positions when turning.
Figure 16 is a fragmentary plan view of the track chain showing the snow packing relief holes.

In order to relieve as much as possible any initial shock or suddenly applied load effect on the cables and to permit the use of a cable with smaller diameter, shock absorbing means are employed as above described, utilizing the levers 14, 14 and springs 16, 16. After shock dissipation by said springs, enough force is exerted at the fulcrum pins 15, 15 to rotate the turntable 10 about its center pin 11. The movement of the turntable 10 moves both of the arms 19, 19 in the same direction, and through the drawbar 20, tends to move the front of the sled 21 in the same direction. This causes the side of the sled 21 to bear against the vertical wall of the snow, and any runners or projections on the bottom of the sled embedded in said snow to resist this turning effort. If this resistance is momentarily great enough to overcome the power needed to move the tractor unit in the desired direction, the tractor unit is moved sidewise. Subsequently, when the angle of resistance becomes great enough in the tractor unit to overcome the holding effort of the sled, said sled is moved around in the direction of turning about the center pin 11 until its angle of resistance becomes greater than the effort of the tractor unit, and then the tractor is again moved in the direction of turning. This alternation in tractor unit and sled as a turning means is repeated until the desired orientation is obtained, after which the steering lever 22 is released and the entire snow tractor follows a course tangent to the curve of turning. Figure 15 illustrates the relative positions of the steering sled 21 and the tractor when turning, the angle between them depending upon how sharp a turn is desired. It is desirable, however, to limit this angle to about fifty degrees to either side of the vertical center line of the tractor. For this reason, automatic kickout pins 33, 33 (Figure 13) are provided, and operate in this manner: When turntable 10 moves to a predetermined maximum position, say fifty degrees, in either direction, one of the projections 34, 34 will contact its corresponding hinged angle bracket 35, 35, causing said bracket to rotate about its center pin 36 and bear against pin 33, which in turn pushes lever 22 into a release position. This has the effect of releasing the brake band 31 allowing the internal gear drum of the corresponding planetary unit 7 to rotate again and eliminate power delivery to its drum 9. The pins 33 are anchored or fastened to cross-member 12a, which is in turn fastened and secured to side members 12B, 12B of the frame 12. The projections 34 are fastened to the turn-table 10 and the hinged brackets 35 are pinned and fastened to cross-member 12a. When turn-table 10 revolves in either direction, one of the brackets 34, 34 moves in and presses against one extended side of its corresponding bracket 35. This bracket 35 being movable on its pin connection 36 presses its other extended side against pin 33, which pin pushes against the bottom of control lever 32 forcing it into released position. With this automatic kickout feature, it is not possible for the angle between the steering sled and the tractor to become so extreme as to make steering difficult or to cause damage. The said projections 34, 34 also act as abutments against the frame 38 to prevent any further rotating movement of the turntable after the automatic kickout action. These abutments are considered necessary when attempting to negotiate a turn while backing, since the back track effort of the planetary units is not enough to hold the turn-table 10 in position when an extreme angle of approximately fifty degrees is reached.

Figures 10, 11:
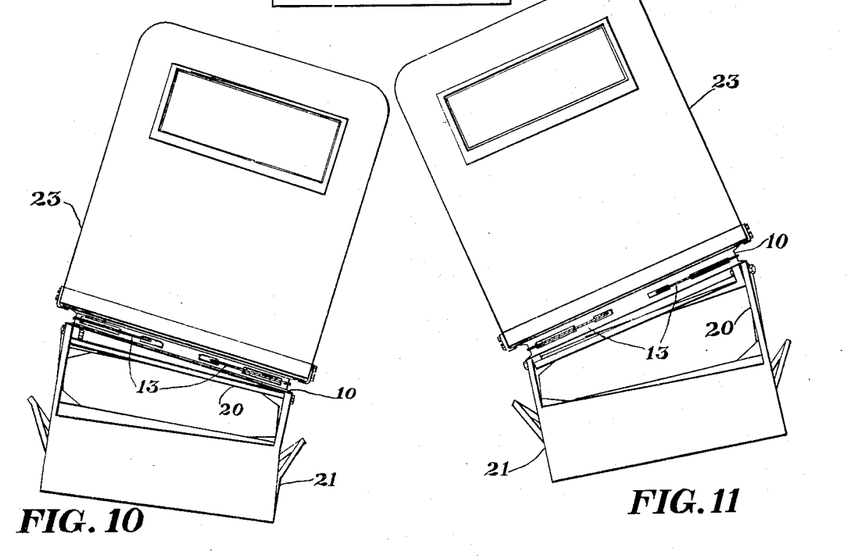
Figure 10 is a rear view showing relative positions of the tractor and sled when listing to the right.
Figure 11 is a rear view showing relative positions of the tractor and sled when listing to the left.

In order to meet all snow conditions, it is necessary to prevent listing as illustrated by Figures 10 and 11. This is accomplished by a low center of gravity and a track wide enough to reduce the pressure of the tractor unit on the snow to three-fourths of a pound per square inch. However, the width is limited to retain the necessary relationship between the total width and the tangential length of the track on the snow surface in the ratio of 54 to 84, respectively. This relationship cannot be varied to any great extent without sacrificing small snow pressure or increased steering effort.

Figure 9:
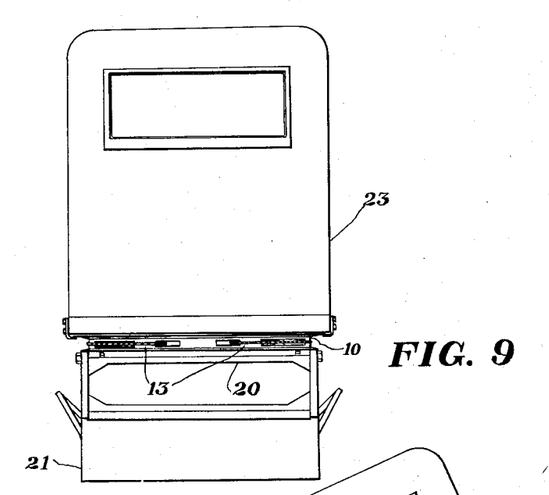
Figure 9 is a rear view showing relative positions of the tractor and sled on a horizontal plane.
Figure 12:
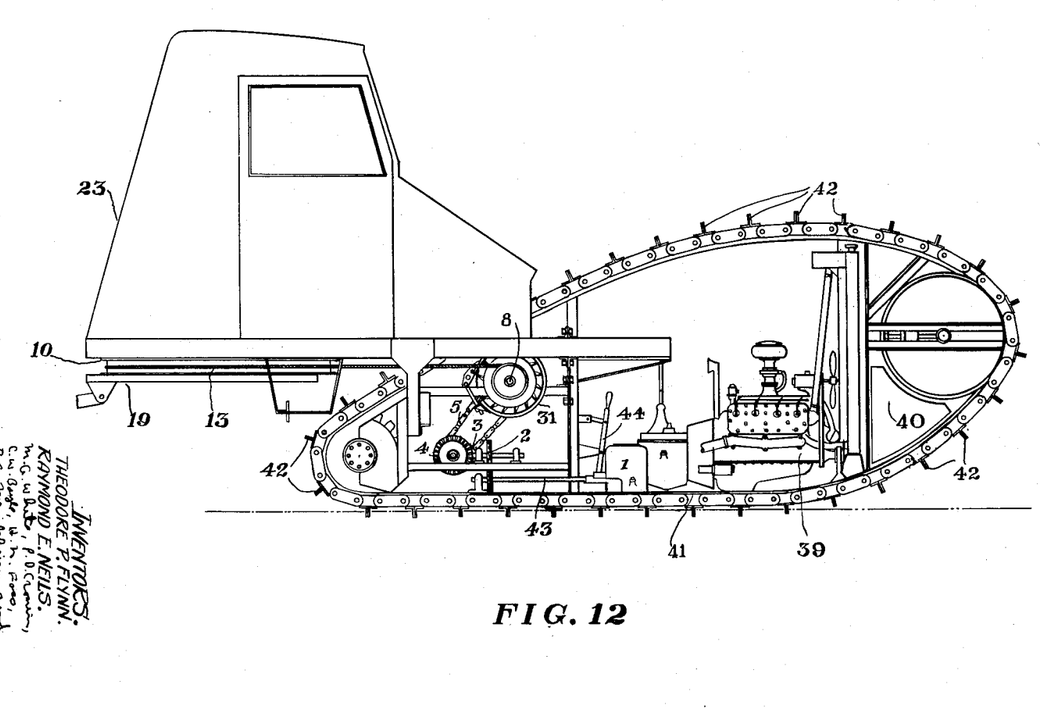
Figure 12 is a side view of the motor with the protection side plates removed.

The low center of gravity is obtained by locating all heavy parts as near to the bottom of the tractor as practicable. Figure 12 shows relative dispositions of the prime mover 39 and the gasoline tank 40 in the bottom of the tractor. As a further means of lowering the center of gravity, the track grousers or cleats 42 are fabricated of a heat-treated aluminum alloy, making it possible to reduce the weight 65 percent in comparison with the same cleats or grousers fabricated of steel. This reduction in weight eliminates an excessive weight over the top of the track frame and decreases the potential effort of the track to act as a weight arm. The less the weight of these cleats, the less will be the listing when the track is operated over the top of the track frame, and this reduction in weight constitutes a marked advantage in retaining the tractor in a normal position parallel to the ground surface, as shown in Figure 9.

Figure 17:
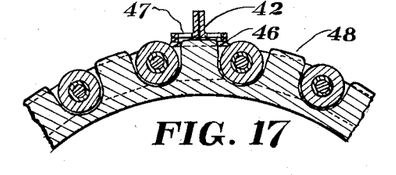
Figure 17 is a cross-sectional view taken along the line 17—17 of Figure 16.

The packing of snow beneath the cleats 42 and the side bars of the driving chain 46 is detrimental to a successful operation of a tractor of this type. To relieve this possibility of packing, holes 47 are disposed along the vertical center line of the drive chain in such a manner that they come exactly over the corners of the teeth of the drive sprocket, substantially as shown in Figures 16 and 17. This permits snow to be pressed through these holes when passing around the sprocket 48. This sprocket 48 may be either the driving sprocket or an idler sprocket. By disposing of the snow in this manner, unnecessary stretching of the chain and excessive bearing pressures are avoided, and the possibility of the driving chain climbing out of the sprocket teeth and becoming disengaged therewith is eliminated.

Having thus described our invention, we claim:

1. In a single track snow tractor, a rudder consisting of a sled trailing said tractor, a turntable rotatably mounted on a pin suspended from the frame of said tractor and rigidly secured to said rudder, flexible cables attached to shock absorbers disposed on said turntable, said shock absorbers consisting of levers pivotally mounted on said turntable, means for connecting said cables to the shorter arms of said levers, and springs tensionally mounted between the longer arms of said levers and said turntable, cable drums for spooling said cables, planetary gear units for independently actuating said cable drums, and a system of kinematic linkages for controlling said planetary gear units.

2. A snow tractor and rudder therefor as described in claim 1, and means for automatically declutching said planetary units when a predetermined angle between said rudder and said tractor is exceeded.

3. In combination, a single track snow tractor, a steering sled trailing said tractor, a pin suspended from the frame of said tractor, a turntable rotatably mounted on said pin, parallel arms connecting said turntable and said rudder, a pair of flexible cables, each having one end secured to said turntable for rotating it in opposite directions, a pair of cable drums, one for spooling each of said cables, and means for independently actuating said cable drums.

4. In combination with a single track snow tractor a steering sled trailing said tractor, a horizontal turntable rotatably mounted on the frame of said tractor, parallel arms linking said turntable to said sled, a pair of flexible cables each attached to a shock absorber disposed on said turntable for yieldably rotating the said turntable in opposite directions, a pair of cable drums for spooling said cables, one drum for each cable, a source of power, and means for selectively transmitting power from said source to said cable drums.

5. In combination, a single track snow tractor, a steering sled trailing said tractor, a turntable rotatably mounted on the frame of said tractor, a pair of parallel arms, each arm having one of its ends vertically hinged to said turntable and the other end secured to said sled, a source of power, and means for selectively transmitting power from said source to said turntable for rotation thereof.

6. In a snow tractor having an endless traction chain driven by sprockets, track cleats mounted on the outside of said chain, said cleats having apertures therethrough spaced so as to precisely register in alignment with the ends of said teeth, whereby, in operation, accumulated frozen material on said teeth is automatically forced out through said apertures by said teeth.

7. In combination, a single track snow tractor and a steering sled in tandem with said tractor, said tractor having a track length and width in the ratio of 54 to 84, respectively, and a ground pressure of substantially eight tenths of a pound per square inch.

THEODORE P. FLYNN.
RAYMOND E. NEILS.